United States Patent [19]
Salmon et al.

[11] Patent Number: 5,938,324
[45] Date of Patent: Aug. 17, 1999

[54] LIGHT PIPE

[75] Inventors: D'Miles E. Salmon, Alameda; John R. Rossum, Fort Bragg; Robert Hastings, Union City, all of Calif.

[73] Assignee: Cisco Technology, Inc., San Jose, Calif.

[21] Appl. No.: 08/726,556

[22] Filed: Oct. 7, 1996

[51] Int. Cl.⁶ .................................................. F21V 7/04
[52] U.S. Cl. ........................ 362/555; 362/551; 362/581; 362/800
[58] Field of Search ................... 362/551, 555, 362/581, 800; 385/88, 89

[56] References Cited

U.S. PATENT DOCUMENTS

| | | | |
|---|---|---|---|
| 4,013,855 | 3/1977 | Reichen et al. | 200/314 |
| 4,163,883 | 8/1979 | Boulanger | 200/314 |
| 4,180,847 | 12/1979 | Cresko et al. | 362/30 |
| 4,241,382 | 12/1980 | Daniel | 362/32 |
| 4,321,655 | 3/1982 | Bouvrande | 362/29 |
| 4,427,879 | 1/1984 | Becher et al. | 250/215 |
| 4,562,832 | 1/1986 | Wilder et al. | 128/20 |
| 4,605,990 | 8/1986 | Wilder et al. | 362/32 |
| 4,796,985 | 1/1989 | Onanian | 350/523 |
| 4,800,466 | 1/1989 | Bauer et al. | 362/26 |
| 4,812,029 | 3/1989 | Onanhian | 350/523 |
| 4,858,086 | 8/1989 | Pietrantonio et al. | 362/123 |
| 4,859,026 | 8/1989 | Arents | 350/96.25 |
| 4,935,856 | 6/1990 | Dragoon | 362/307 |
| 5,063,479 | 11/1991 | Satoh | 362/32 |
| 5,130,761 | 7/1992 | Tanaka | 357/17 |
| 5,219,135 | 6/1993 | Scott | 248/27.1 |
| 5,268,823 | 12/1993 | Yergenson | 362/32 |
| 5,327,328 | 7/1994 | Simms et al. | 362/26 |
| 5,336,859 | 8/1994 | Wojtanek et al. | 200/315 |
| 5,347,123 | 9/1994 | Jackson et al. | 250/229 |
| 5,394,863 | 3/1995 | Sanford et al. | 128/3 |
| 5,529,570 | 6/1996 | Storz | 600/199 |
| 5,538,425 | 7/1996 | Reeves et al. | 433/82 |
| 5,603,283 | 2/1997 | Owen | 116/284 |
| 5,613,750 | 3/1997 | Roe | 362/26 |
| 5,768,459 | 6/1998 | Wolter et al. | 385/88 |

Primary Examiner—Alan Cariaso
Assistant Examiner—Michael J. Smith
Attorney, Agent, or Firm—Carr & Ferrell LLP

[57] ABSTRACT

A light pipe for transmitting LED-emitted light from a printed circuit board through an opening in a panel. The light pipe has a first light-transmitting member with a first end for emitting light, a second end connected to a connecting portion for attaching the light pipe to the printed circuit board, and an outer surface. A groove in the outer surface and clip members are used in various combinations to removably fasten the light pipe to the panel. The groove and clip members permit easy insertion and removal of the light pipe. Alternative embodiments include a plurality of light-transmitting members aligned in various configurations.

35 Claims, 4 Drawing Sheets

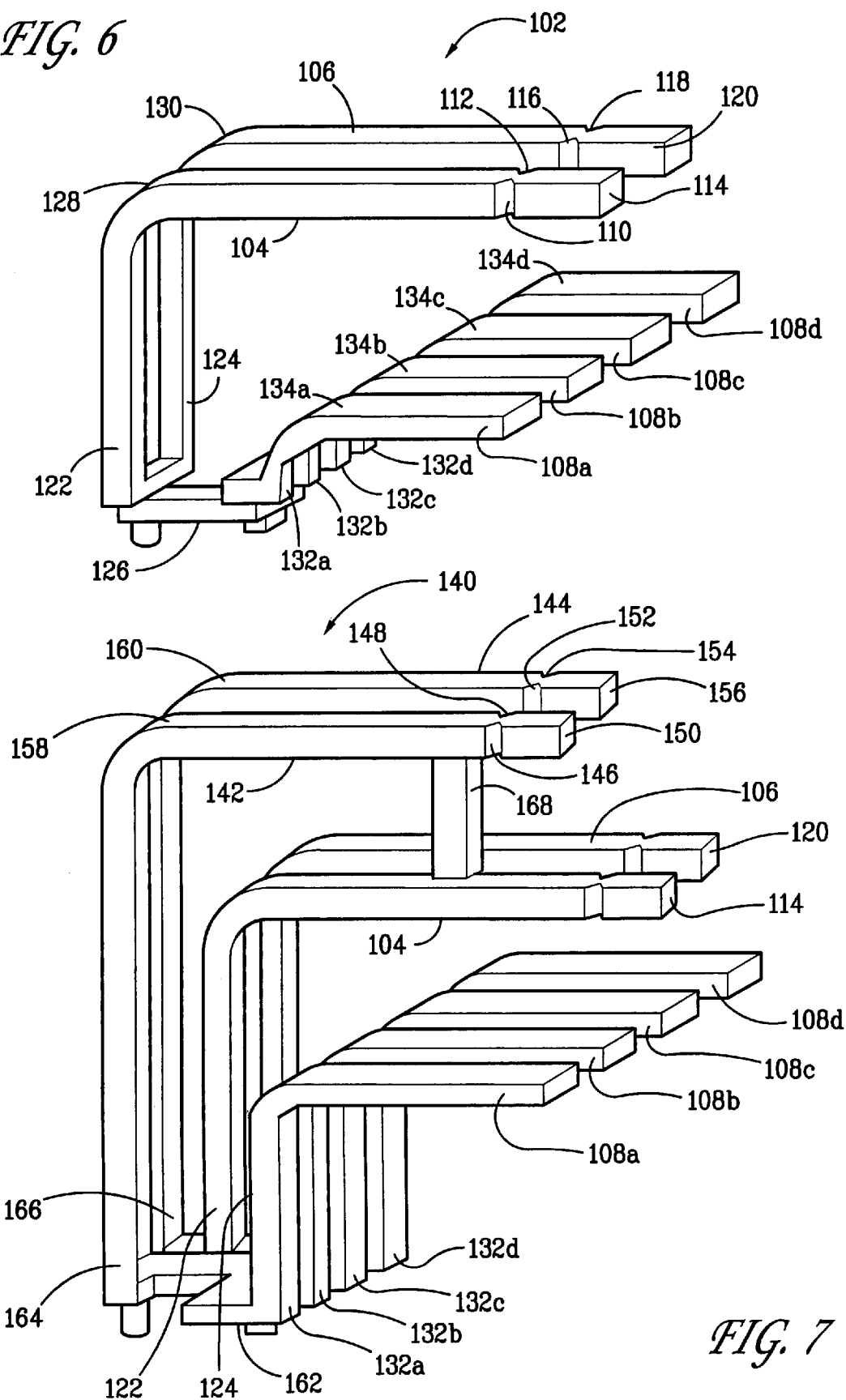

LIGHT PIPE

BACKGROUND OF THE INVENTION

1. Field of the Invention

The present invention relates generally to an optical wave guide for transmitting light from an LED, and more specifically to a light pipe having a fastener for attachment to a display panel and having light-transmitting members disposed in multiple reference planes.

2. Description of the Background Art

Light pipes are commonly used in computer peripheral equipment. Such equipment may, for example, have a light emitting diode (LED) mounted on a printed circuit board and may need to display the LED-emitted light on the equipment display panel to convey status information to a user. A light pipe can be mounted on the printed circuit board and shaped to transmit the LED-emitted light to the display panel. For example, light pipes can direct light from LED elements soldered behind connector jacks to display panel locations above the jacks to indicate jack positions to users.

Light pipes are useful when: (1) an LED is spaced from, or is emitting light away from, a display panel; (2) an unusual shape of light is desired at a display panel; or (3) increasing protection against electrostatic discharge by using the polycarbonate material of a light pipe to isolate the LED. Light pipes having parallel light-transmitting members are useful for displaying a row or a column of lights.

Design and manufacture of electronic equipment containing conventional light pipes is difficult and costly. In addition, conventional assemblies of light pipes, display panels and printed circuit boards are difficult to dismantle for servicing.

Thus, there is a need for a light pipe that overcomes these problems.

SUMMARY OF THE INVENTION

The present invention is a light pipe for transmitting light emitted from an LED mounted on a printed circuit board through at least one opening in a display panel. The light pipe has a light-transmitting member having a first end for emitting light through one of the openings, a second end which forms a connecting portion for attaching the light pipe to the printed circuit board, an outer surface, and a fastener for removably fastening the light pipe to the display panel.

A groove on the outer surface of the light-transmitting member in combination with a pair of clip members form an exemplary fastener. Either or both the grooved light-transmitting member and the clip members can form the fastener, and other types of fasteners could be used as well. Thus, the fastener may include a groove in the outer surface of the first light-transmitting member, and first and second clip members having respective inner ends attached to the outer surface of the light-transmitting member and outer ends with hooks for hooking the display panel.

The light pipe may be installed in or removed from the display panel by flexing the first and second clip members together. The fastener reduces the difficulty and cost of assembling and servicing printed circuit boards and display panels.

The invention simplifies the layout and design of printed circuit boards and display panels, and thereby reduces the size of the resultant electronic equipment. Light pipes with multiple layers (or "reference planes") of parallel light-transmitting members can eliminate the need for multiple printed circuit boards in prior art approaches. In addition, the light pipe of the present invention permits LEDs to be placed at various positions on printed circuit boards and permits additional variations in light configurations on display panels.

Display panel and printed circuit board design and layout are simplified by the present invention where the light pipe has a plurality of light-transmitting members aligned in parallel and a fastening means for fastening the light pipe to the display panel. For displaying additional LED lights on the display panel, a second plurality of light-transmitting members is aligned in parallel to the first plurality.

BRIEF DESCRIPTION OF THE DRAWINGS

FIG. 6 is a perspective view of a fourth embodiment of the light pipe of the present invention; and FIG. 7 is a perspective view of a fifth embodiment of the light pipe of the present invention.

DETAILED DESCRIPTION OF A PREFERRED EMBODIMENT

Figure 1:
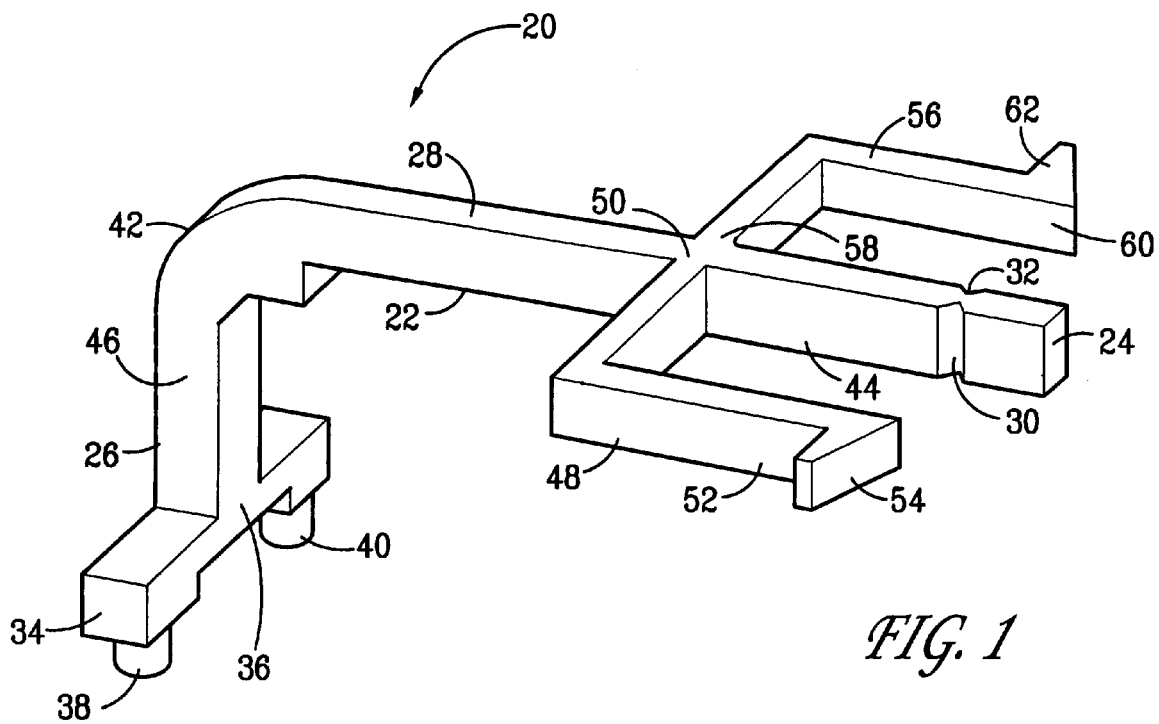
FIG. 1 is a perspective view of a first embodiment of the light pipe of the present invention.

FIG. 1 shows a light pipe 20 which is mountable on a printed circuit board (not shown) for transmitting light from a light emitting diode (LED not shown) on the printed circuit board to a display panel (not shown). Light-transmitting member 22 has a first end 24, a second end 26, and an outer surface 28. When light pipe 20 is mounted on a printed circuit board so that second end 26 is aligned with an LED, light from the LED will enter second end 26, be internally reflected along light-transmitting member 22, and exit from first end 24.

Light pipe 20 has a fastening means for fastening light-transmitting member 22 to a display panel. FIG. 1 discloses the outer surface 28 with grooves 30 and 32 as a fastening means. However, other functionally equivalent fastening means may be used to removably secure the light pipe to a display panel.

Grooves 30 and 32 are located near first end 24 of light-transmitting member 22. However, the distance of grooves 30 and 32 from first end 24 may vary, depending on design requirements.

Light-transmitting member 22 has a rectangular cross-section. Alternatively, light-transmitting member 22 may have a circular cross-section with a continuous groove on the outer surface. The shape of light-transmitting member 22 may vary according to design requirements.

Second end 26 of light-transmitting member 22 is connected to a connecting portion 34 which is used for attaching light pipe 20 to a printed circuit board. Connecting portion 34 may include a press fit pin, a snap-in post, or other functionally equivalent components. Connecting portion 34 includes a cross-member 36 with extending cylindrical portions 38 and 40. Light pipe 20 is mounted on the printed circuit board by friction-fitting the preferably ribbed cylindrical portions 38 and 40 into openings on the printed circuit board.

Connecting portion 34 may be modified in various ways to meet particular design requirements. For example, cross-member 36 may be replaced with a single cylindrical portion attached to second end 26.

Light-transmitting member 22 has a curved portion 42 which joins a first portion 44 and a second portion 46. First portion 44 extends along a first axis from first end 24, and second portion 46 extends along a second axis from second end 26. The curvature and the angle formed by the curved portion 42 and the lengths of first portion 44 and second portion 46 may vary according to design requirements. In an alternate embodiment (not illustrated), light-transmitting member 22 may be linear with all portions thereof disposed on a single axis.

Clip members are also used to fasten light pipe 20 to a display panel. Light pipe 20 has a first clip member 48 having a first or inner end 50 attached to outer surface 28 of light-transmitting member 22 and having a second or outer end 52 with a hook-shaped portion 54. Similarly, a second clip member 56 has an inner end 58 attached to outer surface 28 of light transmitting-member 22 and an outer end 60 with a hook-shaped portion 62. Clip members 48 and 56 may be located on any portion of light-transmitting member 22. In FIG. 1, clip members 48 and 56 are located near first end 24 of light-transmitting member 22.

Figure 2A:
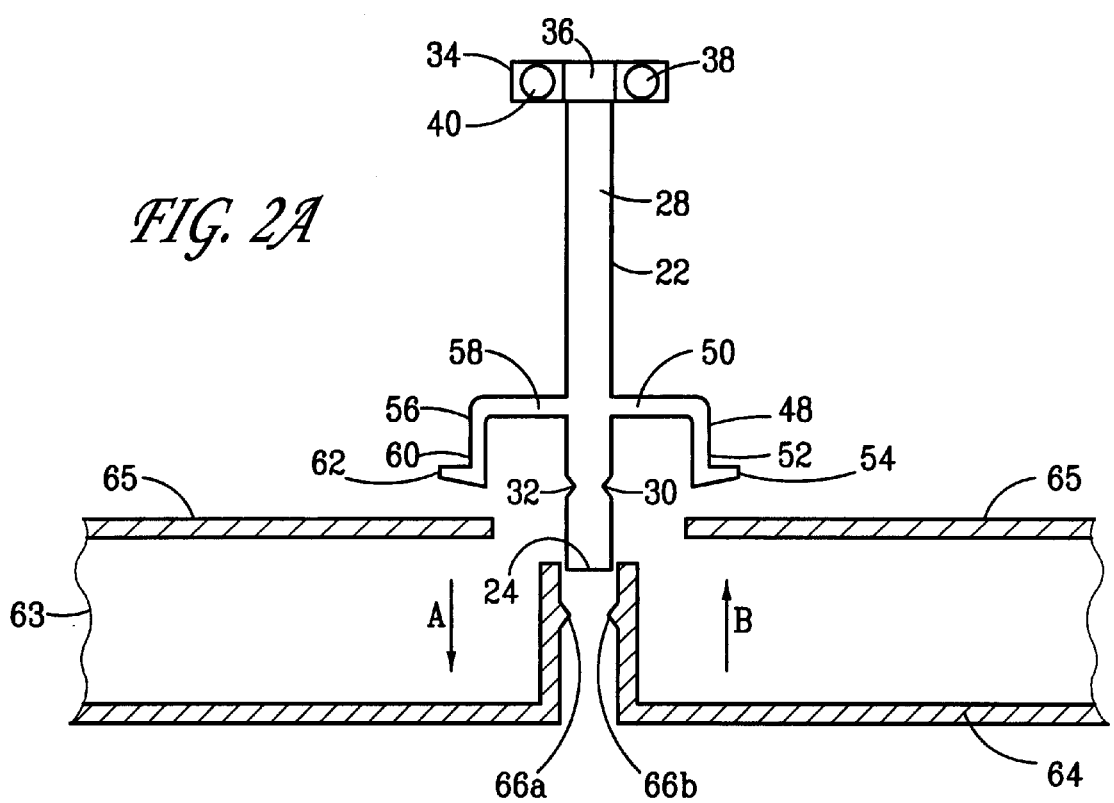
FIGS. 2a and 2b are bottom views of the FIG. 1 light pipe, before and after installation in a display panel seen in partial and cross-section.
Figure 2B:
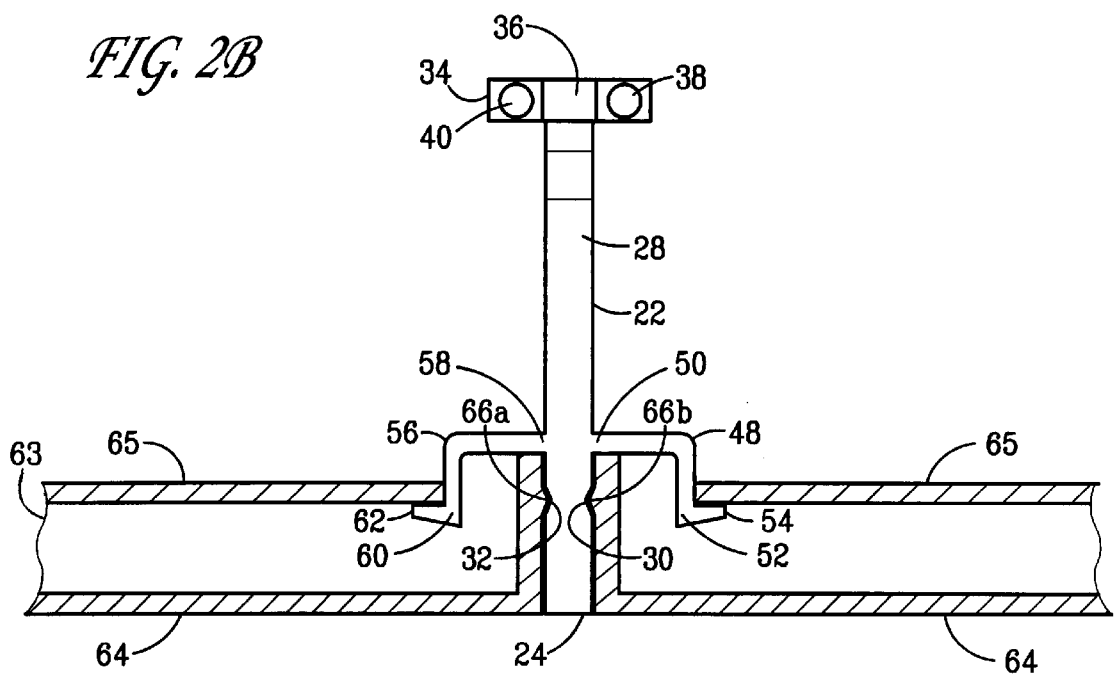

FIGS. 2a and 2b show a bottom view of the light pipe of FIG. 1, and a partial and cross-sectional view of an exemplary display panel 63. FIG. 2a shows how light-transmitting member 22 may be inserted in the direction of arrow A into an opening in display panel 63, and removed in the direction of arrow B. FIG. 2b shows light-transmitting member 22 fastened to display panel 63.

Display panel 63 includes a bezel 64 and a sheet metal backing 65. Bezel 64 has gripping components 66a and 66b that snap into grooves 32 and 30 respectively, to hold light-transmitting member 22. The bezel and sheet metal backing may be parts of a chassis to which components of electronic equipment are attached.

Along with grooves 30 and 32, clip members 48 and 56 are also used to fasten light-transmitting member 22 to display panel 63. Hook-shaped portions 54 and 62 grip sheet metal backing 65, thereby fastening the light pipe to the display panel. Light-transmitting member 22 can be inserted into and removed from openings in the display panel by flexing clip members 48 and 56 together.

Figure 3:
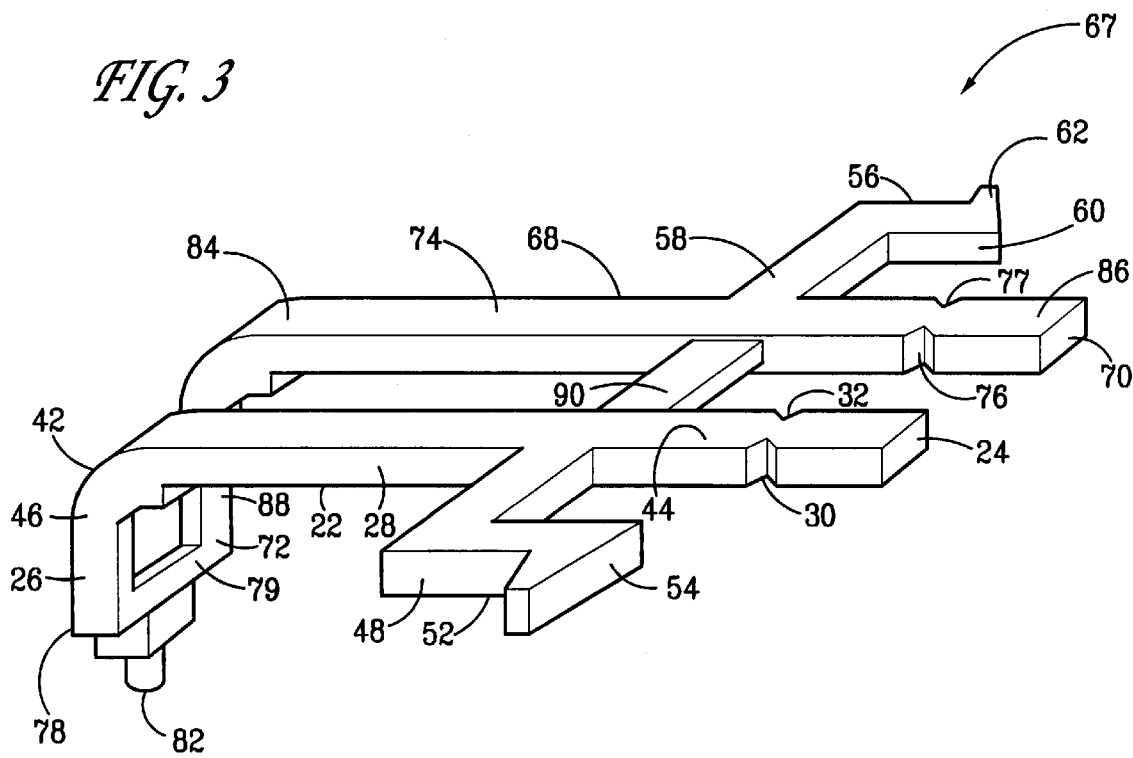
FIG. 3 is a perspective view of a second embodiment of the light pipe of the present invention.

FIG. 3 shows the invention in a second embodiment wherein light pipe 67 includes a second light-transmitting member 68 which is aligned in parallel with first light-transmitting member 22 and has a first end 70, a second end 72, and an outer surface 74. To simplify the drawings, identical or corresponding parts throughout the several views are designated by the same reference numerals.

Light-transmitting members 22 and 68 include curved portions 42 and 84 respectively. First portion 86 of light-transmitting member 68 extends from first end 70 to curved portion 84 along an axis parallel to the axis of first portion 44, and second portion 88 extends from curved portion 84 to second end 72 along an axis parallel to the axis of second portion 46. Alternatively, light-transmitting member 68 may be straight.

Grooves 76 and 77 on outer surface 74 are near first end 70. If, in the alternative, light-transmitting member 68 had a circular cross-section, then outer surface 74 could have a continuous groove.

The second clip member 56 of light pipe 67 has inner end 58 attached to outer surface 74 of light-transmitting-member 68.

Between surface 28 of light-transmitting member 22 and surface 74 of light-transmitting member 68, a connecting portion 90 provides structural support and prevents perceptible cross talk and mixing or bleeding of light between light-transmitting members 22 and 68 and the LEDs on the printed circuit board.

Connecting portion 78 includes a cross-member 79 with an extending cylindrical portion 82. As with all embodiments of the invention, connecting portion 78 may be modified to meet design requirements.

Figure 4:
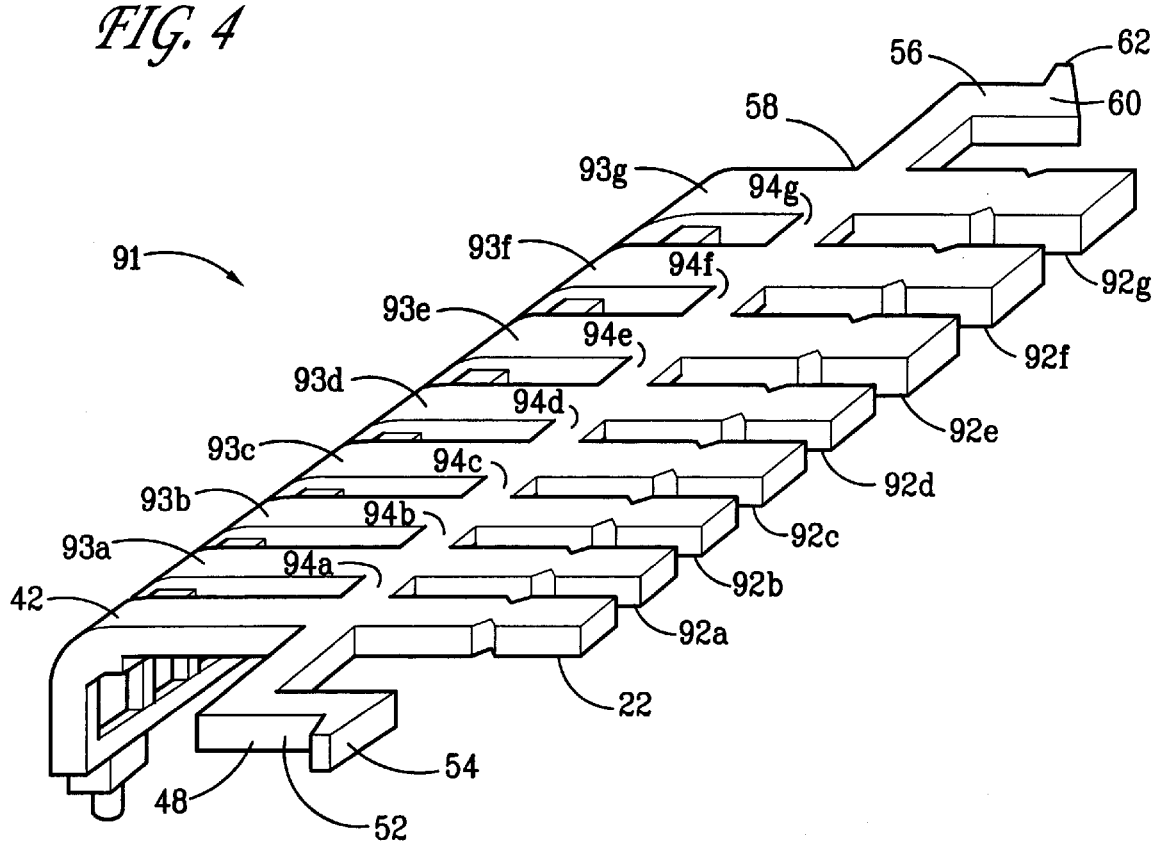
FIG. 4 is a perspective view of a third embodiment of the light pipe of the present invention.

FIG. 4 shows the invention in a third embodiment wherein light pipe 91 has a plurality of light-transmitting members 92a to 92g that are parallel to light-transmitting member 22. Second clip member 56 with inner end 58 is attached to the outer surface of light-transmitting member 92g. Light-transmitting members 92a to 92g respectively include curved portions 93a to 93g. Alternatively, light-transmitting members 22 and 92a to 92g may be linear. The plurality of light-transmitting members can collect light from a similar plurality of LEDs on a printed circuit board and redirect the light to a corresponding plurality of locations on the display panel. The number of light-transmitting members used in the side-by-side configuration of FIG. 4 depends on design requirements. Thus, other embodiments may have more or less light-transmitting members.

Connecting portions 94a to 94g provide structural support and prevent perceptible cross talk and mixing or bleeding of light between adjacent light-transmitting members and the LEDs on the printed circuit board.

Figure 5:
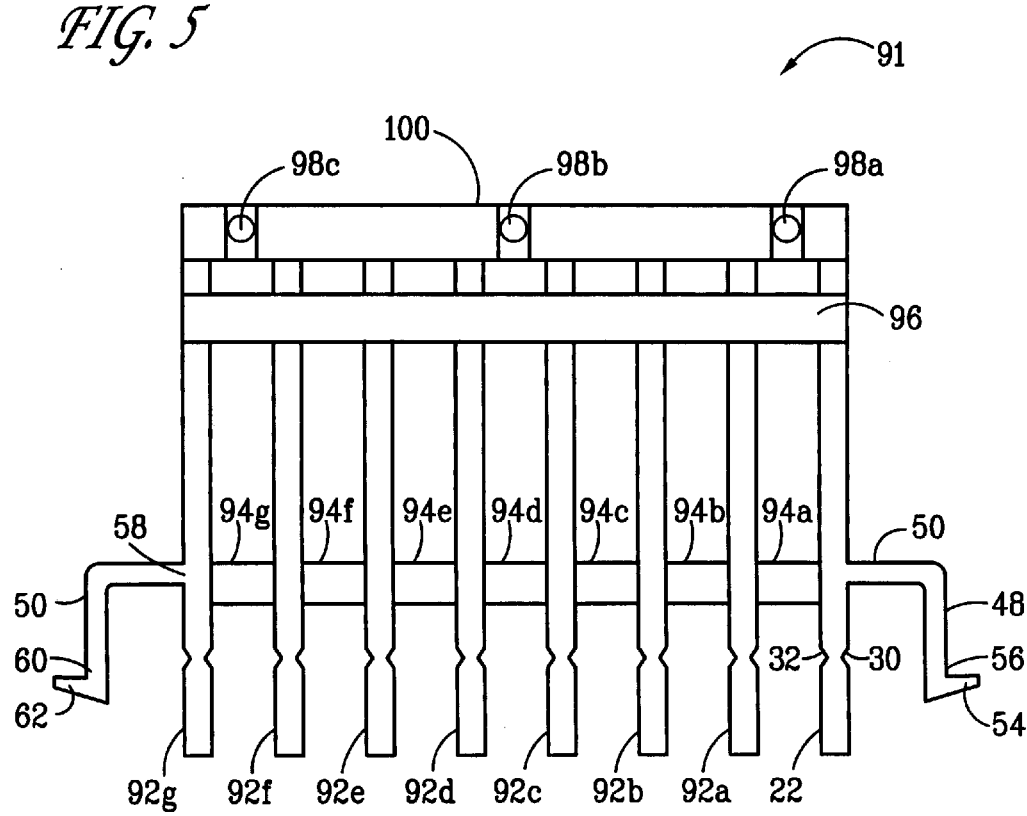
FIG. 5 is a bottom view of the light pipe illustrated in FIG. 4.

FIG. 5 is a bottom view of light pipe 91 in FIG. 4. Connecting portion 96 is attached for structural support to light-transmitting members 22 and 92a to 92g. Cylindrical portions 98a, 98b and 98c extend from a cross-member 100 and serve to attach light pipe 91 to a printed circuit board. FIG. 5 also shows light-transmitting members 92a to 92g as having grooves for removably fastening light pipe 91 to a display panel.

FIG. 6 shows the invention in a fourth embodiment as a light pipe 102 including light-transmitting members 104 and 106 with axes on a first plane and light-transmitting members 108a, 108b, 108c and 108d with axes in parallel on a second plane. Light-transmitting members may be added to or removed from the set of parallel light-transmitting members pair 104 and 106, and from light-transmitting members 108a, 108b, 108c and 108d, depending on design considerations.

Grooves 110 and 112 are formed near first end 114 of light-transmitting member 104, and grooves 116 and 118 are formed near first end 120 of light-transmitting member 106. Light-transmitting members 104 and 106 respectively have curved portions 128 and 130 and second ends 122 and 124 which are attached to connecting portion 126 serving to mount the light pipe on a printed circuit board.

Light-transmitting members 108a, 108b, 108c and 108d include curved portions 134a, 134b, 134c and 134d respectively. In the alternative, light-transmitting members 108a, 108b, 108c and 108d may be linear. Respective ends 132a, 132b, 132c and 132d of light-transmitting members 108a, 108b, 108c and 108d are attached to connecting portion 126.

FIG. 7 shows the invention in a fifth embodiment as a light pipe 140, which includes a second pair of parallel light-transmitting members 142 and 144 in addition to the first pair of light-transmitting members pair 104 and 106 and the plurality of light-transmitting members 108a, 108b, 108c and 108d. Grooves 146 and 148 are located near first end 150 of light-transmitting member 142, and grooves 152 and 154 are located near first end 156 of light-transmitting member 144. Light-transmitting members 142 and 144 respectively have curved portions 158 and 160.

Connecting portion 162, which serves to mount light pipe 140 onto a printed circuit board, is attached to the respective second ends 164 and 166 of light-transmitting members 142 and 144, respective second ends 122 and 124 of light-transmitting members 104 and 106, and respective second ends 132a to 132d of light-transmitting members 108a to 108d.

Light-transmitting members may be added to or subtracted from the pair of members 142 and 144, and additional parallel light-transmitting members may be stacked above members 142 and 144 as desired.

Connecting member 168 attaches at least one of light-transmitting members 142 and 144 to at least one of light-transmitting members 104 and 106.

The light pipe of this invention may be constructed from any light-transmissive material, such as polycarbonate. Preferably, a polycarbonate light pipe has an optical clarity of 80% and a minimum flammability rating of 94V-0. Injection molding is preferably used to produce the various embodiments discussed above. The parts of the light pipes should be free from flash, sink, blush and weld lines.

The fastener for removably fastening the light pipe to the display panel and multiple reference planes formed by the light-transmitting members simplify the layout and design of the printed circuit board and display panel assembly. For example, the multiple reference planes of light-transmitting members eliminate the need for multiple printed circuit boards. Consequently, the present invention makes assembly of the electronic equipment less difficult and less costly. Furthermore, this invention allows reduction in the size of the electronic equipment.

The present invention further simplifies servicing of the electronic equipment by making the light pipe(s) easily removable from both the equipment chassis and the printed circuit board. This invention also allows design flexibility, since LEDs can now be placed in additional positions on the printed circuit board and since additional variations in the light configuration on panels are now possible.

While various embodiments and applications of this invention have been shown and described, it will be apparent to those skilled in the art that various modifications are possible without departing from the inventive concepts described herein. The invention, therefore, is not to be restricted except in the spirit of the appended claims.

What is claimed is:

1. A light pipe for transmitting light emitted from an LED mounted on a printed circuit board through at least one opening in a display panel, comprising:
   a first light-transmitting member having a first end for emitting light through one of said openings, a second end which forms a connection portion for attaching the light pipe to the printed circuit board, and an outer surface; and
   defining means located on the outer surface near the first end for facilitating the connection of the light pipe to the panel so that said first end is aligned with said one of said openings.

2. The light pipe of claim 1 wherein said facilitating means comprises a groove in said outer surface, said groove snapping into gripping elements in a bezel of the display panel.

3. The light pipe of claim 1 wherein said facilitating means comprises:
   a first clip member having an inner end attached to said outer surface and an outer end with a hook-shaped portion for hooking the panel; and
   a second clip member having an inner end attached to said outer surface opposite the inner end of said first clip member and an outer end with a hook-shaped portion for hooking the panel,
   such that the light pipe may be installed in or removed from the panel by flexing said first clip member and said second clip member towards each other.

4. The light pipe of claim 3 wherein said first and second clip members are attached near said first end.

5. The light pipe of claim 3 wherein said facilitating means further comprises a groove in said outer surface.

6. The light pipe of claim 1 wherein said light-transmitting member comprises:
   a curved portion;
   a first portion extending along a first axis from said first end to said curved portion; and
   a second portion extending along a second axis from said curved portion to said second end.

7. The light pipe of claim 1 further comprising a second light-transmitting member having a first end for emitting light through one of said openings, a second end which also forms said connecting portion, and an outer surface.

8. The light pipe of claim 7 wherein the axes of said first and second light-transmitting members are parallel to each other.

9. The light pipe of claim 7 wherein said second light-transmitting member comprises:
   a curved portion;
   a first portion extending along a third axis from said first end to said curved portion of said second light-transmitting member; and
   a second portion extending along a fourth axis from said curved portion to said second end of said second light-transmitting member.

10. The light pipe of claim 7 wherein said second light-transmitting member comprises a structure defining means for facilitating the connection of the light pipe to the panel.

11. The light pipe of claim 10 wherein said facilitating means of said second light-transmitting member comprises a groove in said outer surface of said second light-transmitting member.

12. The light pipe of claim 11 wherein said groove in said outer surface of said second light-transmitting member is near said first end of said second light-transmitting member.

13. A light pipe for transmitting light emitted from LEDs mounted on a printed circuit board through a plurality of openings in a display panel, comprising:
   a first plurality of light-transmitting members aligned in parallel, each of said members having a first end for emitting light through a respective one of the openings, a second end which forms a connecting portion for attaching the light pipe to the printed circuit board, and an outer surface; and
   defining means located on the outer surface near the first end for facilitating the connection of the light pipe to the display panel so that said first ends are aligned with the respective openings in the display panel.

14. The light pipe of claim 13 wherein said facilitating means comprises a respective groove in said outer surface of each of said members.

15. The light pipe of claim 13 wherein said facilitating means comprises:

a first clip member having an inner end attached to said outer surface of a first one of said light-transmitting members and having an outer end with a hook-shaped portion for hooking the panel; and a second clip member having an inner end attached to said outer surface of a second one of said light-transmitting members and having an outer end with a hook-shaped portion for hooking the panel, such that the light pipe may be installed in or removed from the panel by flexing said first clip member and said second clip member towards each other.

16. The light pipe of claim 15 wherein said first and second clip members are attached respectively near said first end of said first one and said second one of said first plurality of light-transmitting members.

17. The light pipe of claim 15 wherein said facilitating means of said first plurality of light-transmitting members further comprises a respective groove in each of said outer surfaces.

18. The light pipe of claim 13 wherein each of said first plurality members comprises:

a curved portion;

a first portion extending along a corresponding axis in a first set of parallel axes from said first end to said curved portion of a first plurality member; and a second portion extending along a corresponding axis in a second set of parallel axes from said curved portion to said second end of the first plurality member.

19. The light pipe of claim 13 further comprising a second plurality of light-transmitting members aligned in parallel, each of said members having a first end for emitting light through a respective one of the openings and a second end which forms the connecting portion.

20. A light pipe for transmitting light emitted from LEDs mounted on a printed circuit board through a plurality of openings in a display panel, comprising:

a first light-transmitting member having a first end for emitting light through one of the openings, a second end which forms a connecting potion for attaching the light pipe to the printed circuit board, and an outer surface;

defining means located towards the first end for facilitating the connection of the light pipe to the display panel; and a first plurality of light-transmitting members aligned in parallel, each of said first plurality of members having a first end for emitting light through a respective one of the openings and a second end which forms a connecting portion.

21. The light pipe of claim 20 wherein an axis of each of said first plurality of light transmitting members is disposed in a first plane and an axis of said first light-transmitting member is disposed in a plane different from the first plane.

22. The light pipe of claim 20 wherein said facilitating means comprises a groove in said outer surface.

23. The light pipe of claim 20 wherein said facilitating means comprises:

a first clip member having an inner end attached to said outer surface and an outer end with a hook-shaped portion for hooking the panel; and a second clip member having an inner end attached to said outer surface opposite the inner end of said first clip member and an outer end with a hook-shaped portion for hooking the panel, such that the light pipe may be installed in or removed from the panel by flexing said first clip member and said second clip member towards each other.

24. The light pipe of claim 23 wherein said facilitating means further comprises a groove in said outer surface.

25. The light pipe of claim 20 wherein said light-transmitting member comprises:

a curved portion;

a first portion extending along a first axis from said first end to said curved portion of said light-transmitting member; and a second portion extending along a second axis from said curved portion to said second end of said light-transmitting member.

26. The light pipe of claim 20 wherein each of said first plurality members comprises:

a curved portion;

a first portion extending along a corresponding axis in a first set of parallel axes from said first end to said curved portion of a first plurality member; and a second portion extending along a corresponding axis in a second set of parallel axes from said curved portion to said second end of the first plurality member.

27. A light pipe for transmitting light emitted from LEDs mounted on a printed circuit board through a plurality of openings in a display panel, comprising:

means for transmitting light from the printed circuit board to respective ones of said plurality of openings in the display panel;

said means for transmitting light defining means located on outer surface near a first end of the means for transmitting light for fastening the first end of said means for transmitting light to the display panel in such a manner as to align said first end with the plurality of openings in the display panel; and means for attaching a second end of said means for transmitting light to the printed circuit board.

28. The light pipe of claim 27 wherein said means for transmitting comprises:

a first light-transmitting member having an outer surface, a first end for emitting light through one of said openings, and a second end which forms the attaching means.

29. The light pipe of claim 28 wherein said fastening means comprises a groove in said outer surface.

30. The light pipe of claim 28 wherein said fastening means comprises:

a first clip member having an inner end attached to said outer surface and an outer end with a hook-shaped portion for hooking the panel; and a second clip member having an inner end attached to said outer surface opposite the inner end of said first clip member and an outer end with a hook-shaped portion for hooking the panel, such that the light pipe may be installed in or removed from the panel by flexing said first clip member and said second clip member towards each other.

31. The light pipe of claim 30 wherein said fastening means further comprises a groove in said outer surface.

32. The light pipe of claim 27 wherein said means for transmitting comprises a first plurality of light-transmitting members aligned in parallel, each of said members having an outer surface, a first end for emitting light through a respective one of said openings, and a second end which forms the attaching means.

33. The light pipe of claim 32 wherein said fastening means comprises a respective groove in said outer surface of each of said members.

34. The light pipe of claim 32 wherein said fastening means comprises:
   a first clip member having an inner end attached to said outer surface of a first one of said light-transmitting members and having an outer end with a hook-shaped portion for hooking the panel; and
   a second clip member having an inner end attached to said outer surface of a second one of said light-transmitting members and having an outer end with a hook-shaped portion for hooking the panel,
   such that the light pipe may be installed in or removed from the panel by flexing said first clip member and said second clip member towards each other.

35. The light pipe of claim 34 wherein said fastening means further comprises a respective groove in said outer surface of each of said members.

* * * * *